(12) United States Patent
Ito

(10) Patent No.: US 7,772,534 B2
(45) Date of Patent: Aug. 10, 2010

(54) DISPLAY DEVICE AND PROJECTOR FOR MODULATING IRRADIATION LIGHT TO FORM AN OPTICAL IMAGE AND DISPLAYING THE OPTICAL IMAGE HAVING A SPATIAL LIGHT MODULATION ELEMENT WITH PLURAL SUB-PIXELS

(75) Inventor: Yoshitaka Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 487 days.

(21) Appl. No.: 11/845,488

(22) Filed: Aug. 27, 2007

(65) Prior Publication Data
US 2008/0062386 A1   Mar. 13, 2008

(30) Foreign Application Priority Data
Sep. 11, 2006   (JP)   ............................. 2006-245758

(51) Int. Cl.
*H01L 27/00*   (2006.01)
(52) U.S. Cl. .................................... 250/208.1; 250/216
(58) Field of Classification Search ................. 250/226, 250/208.1, 216; 353/31, 75, 84, 97; 349/5, 349/7, 8, 77, 119, 193; 362/231, 227, 230; 348/742; 359/494, 495, 639; 345/108, 32, 345/56
See application file for complete search history.

(56) References Cited

U.S. PATENT DOCUMENTS 6,540,361 B1 * 4/2003 Hayashi ...................... 353/31

7,364,305 B2   4/2008 Itoh

FOREIGN PATENT DOCUMENTS

| JP | A-2004-118133 | 4/2004 |
| JP | A-2005-321502 | 11/2005 |
| JP | A-2006-154798 | 6/2006 |

OTHER PUBLICATIONS

Roth, S., et al. "64.4: Four Primary Color Projection Display," *SID 05 Digest*, pp. 1818-1821, (2005).
Yamaguchi, M. "Multiprimary Color Displays," *Imaging Science and Engineering Laboratory*, Tokyo Institute of Technology, pp. 73-79. (Nov. 1999).

* cited by examiner

*Primary Examiner*—Que T Le
(74) *Attorney, Agent, or Firm*—Oliff & Berridge, PLC

(57) ABSTRACT

A display device for modulating irradiation light with a spatial light modulation element to form an optical image, and displaying the optical image, includes a light source for emitting the irradiation light including four kinds of colored light having wavelength ranges, a temporal colored light separating section that spatially separates the irradiation light by the wavelength range to generate first irradiation light, and second irradiation light alternately every sub-frame period, a spatial colored light separating section that spatially separates the colored light included in each of the first irradiation light and the second irradiation light, and a spatial light modulation element provided with a plurality of sub-pixels, capable of independently modulating every sub-frame period.

12 Claims, 10 Drawing Sheets

DISPLAY DEVICE AND PROJECTOR FOR MODULATING IRRADIATION LIGHT TO FORM AN OPTICAL IMAGE AND DISPLAYING THE OPTICAL IMAGE HAVING A SPATIAL LIGHT MODULATION ELEMENT WITH PLURAL SUB-PIXELS

BACKGROUND

1. Technical Field

The present invention relates to a display device and a projector, and, in particular to a projector capable of expressing a wide range of color gamut and for forming a protection image using four kinds of colored light.

2. Related Art

As the performance of a display apparatus is advanced, a technology for reproducing a life faithfully and with natural colors has been desired. A typical display apparatus uses a method of generating a color mage using colored light of the three primary colors, namely red colored light (R), green colored light (G), and blue colored light (B). However, partially because of restriction of a color filter or a fluorescent material, the method can only cover about a half of the color gamut perceivable to the human (on the basis of Munsell color chart). Therefore, in some cases, the colors displayed on a screen have a different cast from the life cast, thus the application field of the display apparatus is limited by itself. Therefore, development of a display apparatus capable of covering a broader range of color gamut had been desired.

Under the above circumstances, development of a so-called multi-primary color display, which increases the colored light from the three primary colors in the past to expand the expressible color gamut, has been activated (see, e.g., Non-patient Document 1 (Masahiro Yamaguchi, "Multi-primary Color Display," Color Forum Japan '99 Proceedings, Four Associations Concerning Optics, November 1999, pp. 73-79). The same applies to projectors, which realize a large screen display by enlargedly projecting an image formed on small-sized light valves.

Further, Non-patent Document 2 (S. Roth, et al. 2005 SID int. Symp. Tech. Digest of Papers, pp. 1818-1821 (2005)) discloses a projector using four transmissive liquid crystal light valves. In this projector, it is arranged that by adding yellow light (Y), which can be modulated independently, to the three primary colors of light (R, G, and B) of the past, the expressible color gamut can be expanded about 1.45 times as large as that of the past, thus the cast of colors, which cannot be expressed by the projector of the past, can be expressed.

The projectors disclosed in the Non-Patent Documents 1 and 2 have the optical configurations of combining the three primary color light beams independently modulated by the three liquid crystal light valves, respectively, which are used in existing projectors, as the base configurations, and add the same liquid crystal light valve in the past thereon as the fourth light modulation means, thus realizing the multi-primary color display.

As described above, although the projector using the multi-primary color light beams has been realized in principle, as the number of liquid crystal light valves increases, the number of components also increases, thus the configuration of the optical system becomes problematically complicated. Therefore, the problem of difficulty in downsizing and cost reduction of the projector apparatus arises.

SUMMARY

In consideration of the above problem, the present invention has an advantage of providing a display device and a projector realizing downsizing and cost reduction of the device and having superior practical utility while expanding the expressible color gamut compared to the device in the past by forming an image using four kinds of colored light.

According to a first aspect of the invention, there is provided a first display device for modulating irradiation light with a spatial light modulation element to form an optical image, and displaying the optical image, including a light source for emitting the irradiation light including four kinds of colored light having wavelength ranges within a visible range and different from each other, a temporal colored light separating section that temporally separates the irradiation light including the four kinds of colored light by the wavelength range to generate first irradiation light including first colored light and second colored light, and second irradiation light including third colored light and fourth colored light alternately and every sub-frame period, a spatial colored light separating section that spatially separates the colored light included in each of the first irradiation light and the second irradiation light to generate the first colored light and the second colored light in a first sub-frame period and to generate the third colored light and the fourth colored light in a second sub-frame period temporally adjacent to the first sub-frame period, and a spatial light modulation element provided with a plurality of sub-pixels, capable of independently modulating every sub-frame period one of a set of the first colored light and the second colored light and a set of the third colored light and the fourth colored light respectively entering two of the sub-pixels disposed adjacent to each other.

It should be noted that "sub-frame period" in the invention denotes the period obtained by dividing one frame in two. For example, if the spatial light modulation element is driven in a general drive frequency of 60 Hz, time corresponding to the one frame period is $1/60$ second (about 16.6 millisecond) while the time corresponding to the one sub-frame period becomes $1/120$ second (about 8.3 millisecond). Further, "sub-pixel" denotes the minimum unit composing a pixel, and in the embodiments of the invention, the pixel is composed of two sub-pixels disposed adjacent to each other.

The first display device according to the first aspect of the invention is capable of modulating two kinds of colored light independently, uses one spatial light modulation element capable of performing display every sub-frame period (e.g., $1/120$ second (120 Hz)), and inputs the two kinds of colored light to the spatial light modulation element while switching the combination of the two kinds of colored light by the sub-frame to modulate each of the colored light, thereby realizing the color display with four primary colors of light by one frame. In other words, the display device according to this aspect of the invention has a feature of simultaneously using the time-sharing type of modulation for modulating the two kinds of colored light the combination of which is switched by the sub-frame and the spatial separation type of modulation for modulating two kinds of colored light obtained by spatially separating on the spatial light modulation element. Thus, from the standpoint of the unit of the frame period ($1/60$ second, 60 Hz display) as the typical unit time for display, the color display with four primary colors of light becomes possible by using a single spatial light modulating element. As described above, in the first display device according to this aspect of the invention, expansion of the expressible color gamut can be realized by using four primary colors of light for the color display, and at the same time, downsizing and cost reduction of the device can also be realized because only one spatial light modulation element is required.

According to a second aspect of the invention, there is provided a second display device for modulating irradiation light with a spatial light modulation element to form an optical image, and displaying the optical image, including a light source for emitting the irradiation light including four kinds of colored light having wavelength ranges within a visible range and different from each other, a spatial colored light separating section that spatially separates the irradiation light including the four kinds of colored light to generate first irradiation light including first colored light and second colored light, and second irradiation light including third colored light and fourth colored light, a temporal colored light separating section that convertes the first colored light and the third colored light out of the four kinds of colored light into a first polarization state, and converts the second colored light and the fourth colored light into a second polarization state in a first sub-frame period, converts the first colored light and the third colored light into the second polarization state and converts the second colored light and fourth colored light into the first polarization state in a second sub-frame period temporally adjacent to the first sub-frame period, and selectively transmits the colored light in one of the first polarization state and the second polarization state, generates the first colored light and the third colored light in the first sub-frame period, and generating second colored light and the fourth colored light in the second sub-frame period, and a spatial light modulation element provided with a plurality of sub-pixels, capable of independently modulating every sub-frame period one of a set of the first colored light and the third colored light and a set of the second colored light and the fourth colored light respectively entering two of the sub-pixels disposed adjacent to each other.

In the second display device according to the second aspect of the invention, a similar advantage to the advantage in the first display device of the first aspect of the invention that expansion of the expressible color gamut can be realized by using four primary colors of light for the color display, and at the same time, downsizing and cost reduction of the device can also be realized because of requirement of only one spatial light modulation element can also be obtained. Further, the second display device of the second aspect of the invention is different from the first display device of the first aspect of the invention in the point where the first display device temporally separates the colored light according to the wavelength range with the temporal colored light separating section while the second display device temporally separates the colored light in accordance with the polarization state with the temporal colored light separating section. Therefore, the present configuration is preferably applied to the case in which the spatial light modulation element performs modulation using polarized light such as a liquid crystal light valve.

Further, if the four kinds of colored light include blue light, first green light, second green light, and red light, it is preferable to have a configuration in which the first green light and the second green light respectively enter the two sub-pixels of the spatial light modulation element disposed adjacent to each other.

In the blue light, the green light, and the red light, the green light is the light having the most significant influence to the resolution. Therefore, if the first green light and the second green light are assigned (in different sub-frame periods) to the same side of the two sub-pixels forming one pixel, the advantage of improvement of resolution can hardly be obtained, and accordingly, by assigning the first green light and the second green light to the different sub-pixels, respectively (regardless of the same sub-frame period or the different sub-frame periods), the advantage of improvement of the resolution can sufficiently be obtained.

Further, in the configuration described above, it is preferable that the first green light and the second green light are respectively generated in the two sub-frame periods temporally adjacent to each other.

As is understood from the fact that the ratio of the amounts of light of the blue light, the green light, and the red light for displaying a color image is typically set to 1:6:3, the amount of the green light tends to be the largest of all of the colored light (e.g., the tendency becomes especially strong if a light source having the greater amount of green light than the amount of other colored light such as a high-pressure mercury vapor lamp is used as the light source). Therefore, if the first green light and the second green light are assigned to the same sub-frame period and the red light and the blue light are assigned to the other sub-frame, the variation in the amount of light becomes large between sub-frames, which might cause the flicker (blink in the brightness), and is not preferable. Therefore, from the view point of prevention of the flicker, it is preferable to assign the first green light and the second green light to the different sub-frame periods from each other.

According to a third aspect of the invention, there is provided a third display device for modulating irradiation light with a spatial light modulation element to form an optical image, and displaying the optical image, including a light source section including a plurality of light sources capable of respectively emitting four kinds of colored light having wavelength ranges within a visible range and different from each other, making a first light source and a second light source, which are capable of respectively emitting two kinds of colored light out of the four kinds of colored light, and a third light source and a fourth light source, which are capable of respectively emitting two kinds of colored light different from the two kinds of colored light, emit light alternatively, thereby generating first irradiation light including the first colored light and the second colored light and second irradiation light including the third colored light and the fourth colored light alternatively every sub-frame period, a spatial colored light separating section that spatially separates the two kinds of colored light included in each of the first irradiation light and the second irradiation light to generate the first colored light and the second colored light in a first sub-frame period and to generate the third colored light and the fourth colored light in a second sub-frame period temporally adjacent to the first sub-frame period, and a spatial light modulation element provided with a plurality of sub-pixels, capable of independently modulating every sub-frame period one of a set of the first colored light and the second colored light and a set of the third colored light and the fourth colored light respectively entering two of the sub-pixels disposed adjacent to each other.

In contrast that in the first and the second display devices of the first and the second aspects of the invention, a so-called white light source having emission spectrum throughout the entire visible range such as a high-pressure mercury vapor lamp is assumed as the light source, in the third display device according to the third aspect of the invention, a light source emitting light having a narrow wavelength range not covering the entire visible range (hereinafter, such light is referred to as a monochromatic light, and a light source emitting the monochromatic light is referred to as a monochromatic light source), such as a light emitting diode (hereinafter abbreviated as LED), electroluminescence (EL), or a laser is assumed as the light source. In the third display device according to the third aspect of the invention, a similar advantage to the advantage in the first and second display devices of the first and second aspects of the invention that expansion of the expressible color gamut can be realized by using four primary colors of light for the color display, and at the same time, downsizing and cost reduction of the device can also be realized because of requirement of only one spatial light modulation element can also be obtained.

Further, in the third display device according to the third aspect of the invention, the first irradiation light including the first colored light and the second colored light and the second irradiation light including the third colored light and the fourth colored light can be generated alternately every sub-frame period only by making a set of the first light source and the second light source and a set of the third light source and the fourth light source emit light alternately. Therefore, in the third display device according to the third aspect of the invention, the temporal colored light separating section used in the first and the second display devices according to the first and the second aspects of the invention can be eliminated, thus further downsizing and cost reduction of the device can be achieved. Furthers since the four kinds of light sources with different wavelength ranges are used, the combination of the colored light in each of the sub-frame periods can be set with freedom. Thus, the spatial colored light separating section that intervens therebetween can be set to have the spectral characteristic with which the spatial colored light separating section can easily be manufactured, and accordingly, improvement of the performance and cost reduction of the spatial colored light separating section can easily be realized. Further, since it is only required to have the plurality of light sources emit light intermittently, the emission intensity can easily be enhanced, thus the brighter display can be realized.

In the first through the third display devices according to the first through the third aspects of the invention, what includes a reflecting element having two reflecting surfaces at least one of which is a wavelength selective reflecting surface disposed to have different incident angles with respect to the incident light can be used as the spatial colored light separating section.

In the present configuration, at least one of the wavelength selective reflecting surfaces is arranged to have a property of transmitting two kinds of colored light out of the four kinds of the colored light and of reflecting the rest two kinds thereof. By thus arranging, it is assumed that the two kinds of colored light each enter each of the two reflecting surfaces, but the two reflecting surfaces are disposed to have different entrance angles, and accordingly, it is assumed that the emission angles of the reflected light are different between the two kinds of colored light and the other two kinds of colored light. Therefore, by optimizing the tilts of the two reflecting surfaces, the incident angles of the reflected light of the two kinds of the colored light each to the spatial light modulation element can be controlled, thus each of the colored light can be made enter the two sub-pixels adjacent to each other with good accuracy.

Further, the colored light reflected by the wavelength selective reflecting surface of the reflecting element is preferably the colored light with the weakest light intensity of the colored light emitted from the light sources.

When the colored light having a predetermined wavelength range enters the wavelength selective reflecting surface (dichroic surface) of the reflecting element, the reflective characteristic and the transmissive characteristic are generally not equivalent, and the reflected light has a smaller light loss than the transmitted light. Therefore, although the configuration of this aspect of the invention can be realized by reflecting or transmitting either one of the colored light by the wavelength selective reflecting surface, the configuration of reflecting the colored light having the weakest light intensity of all of the colored light emitted from the light source with the wavelength selective reflecting surface is preferable because it can make the light loss of the colored light with the weakest light intensity smaller to easily balance the light intensity with other colored light, and as a result, a bright image can be obtained.

Further, in the case of the configuration described above, it is desirable to provide a polarization conversion element for converting unpolarized light emitted from the light source into S-polarized light between the light source and the spatial colored light separating section.

Since the wavelength selective reflecting surface of the reflecting element generally has a higher reflectance of the S-polarized light than that of the P-polarized light, by providing the polarization conversion element for converting unpolarized light emitted from the light source into S-polarized light, the light efficiency can be enhanced.

According to a fourth aspect of the invention, there is provided a fourth display device for modulating irradiation light with a spatial light modulation element to form an optical image, and displaying the optical image, including a light source section including a plurality of light sources capable of respectively emitting four kinds of colored light having wavelength ranges within a visible range and different from each other, making a first ht source and a second light source, which are capable of respectively emitting two kinds of colored light out of the four kinds of colored light, and a third light source and a fourth light source, which are capable of respectively emitting two kinds of colored light different from the two kinds of colored light, emit light alternatively, thereby generating first irradiation light including the first colored light and the second colored light and second irradiation light including the third colored light and the fourth colored light alternatively every sub-frame period, and also capable of emitting the first colored light and the second colored light to a spatially distant position, and of emitting the third colored light and the fourth colored light to a spatially distant position, and a spatial light modulation element provided with a plurality of sub-pixels, capable of independently modulating every sub-frame period one of a pair of the first colored light and the second colored light and a pair of the third colored light and the fourth colored light respectively entering two of the sub-pixels disposed adjacent to each other.

In the fourth display device according to the fourth aspect of the invention, the monochromatic light source for emitting monochromatic light such as LED, EL, or a laser is assumed as the light source similarly to the case with the third display device according to the third aspect of the invention. In the fourth display device according to the fourth aspect of the invention, a similar advantage to the advantage in the first through the third display devices of the first through the third aspects of the invention that expansion of the expressible color gamut can be realized by using four primary colors of light for the color display, and at the same time, downsizing and cost reduction of the device can also be realized because of requirement of only one spatial light modulation element can also be obtained. Further, in the fourth display device according to the fourth aspect of the invention, since the light source section is capable of emitting the first colored light and the second colored light to the spatially distant positions, and of emitting the third colored light and the fourth colored light to the spatially distant positions, each of the colored light can enter the sub-pixels adjacent to each other. Therefore, in the fourth display device according to the fourth aspect of the invention, the spatial colored light separating section used in, the third display device according to the third aspect of the invention can be eliminated, thus further downsizing and cost reduction of the device can be achieved.

Further, if the four kinds of colored light include blue light, first green lights second green light, and red light, it is preferable for the first green light and the second green light to respectively enter the two sub-pixels of the spatial light; modulation element disposed adjacent to each other.

In the third and fourth display devices of the third and the fourth aspects of the invention, similarly to the case explained with respect to the first and the second display devices of the first and the second aspects of the invention, by assigning the first green light and the second green light to the two different sub-pixels, the advantage of improvement of resolution can sufficiently be obtained.

Further, according to a fifth aspect of the invention, there is provided a further display device for modulating irradiation light with a spatial light modulation element to form an optical image, and displaying the optical image, including a light source section for emitting the irradiation light including four kinds of colored light having wavelength ranges within a visible range and different from each other, and a spatial light modulation element provided with a plurality of sub-pixels, and capable of independently modulating first colored light and second colored light respectively enter two of the sub-pixels adjacent to each other in a first sub-frame period, and third colored light and fourth colored light respectively enter the two sub-pixels in a second sub-frame period temporally adjacent to the first sub-frame period.

According to the present configuration, expansion of the expressible color gamut can be realized by using four primary colors of light for the color display, and at the same time, downsizing and cost reduction of the device can also be realized because only one spatial light modulation element is required.

According to a sixth aspect of the invention, there is provided a projector including either one off the display devices according to the first through fifth aspect of the invention described above, and a projection section that projects the optical image obtained by the display device.

According to the present configuration, expansion of the expressible color gamut can be realized by using four primary colors of light for the color display, and at the same time, downsizing and cost reduction of the projector can also be realized because only one spatial light modulation element is required.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

First Embodiment

Hereinafter, a first embodiment of the invention will be explained with reference to FIGS. 1 through 7.

In the present embodiment, a configuration example of a liquid crystal projector using a white light source and a rotating color filter will be explained. Further, it is assumed that blue light, first green light (blue-tinged green), a second green light (yellow-tinged green), and red light are used as the four kinds of colored light. It should be noted that in the following explanations, the colored light mentioned above will be denoted as B light, G1 light, G2 light, and R light for the sake of convenience.

Figure 1:
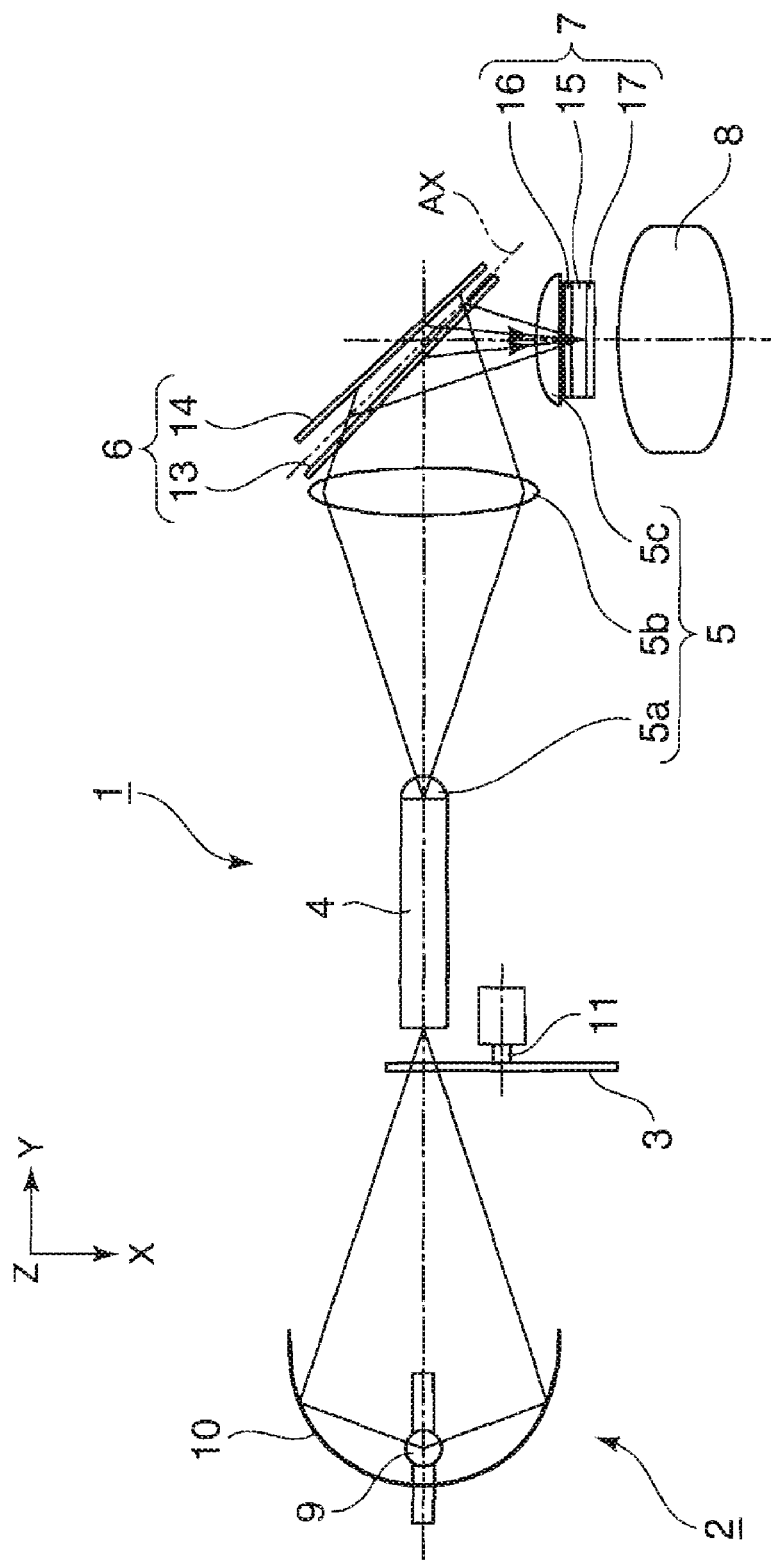
FIG. 1 is a schematic configuration diagram of a projector according to a first embodiment of the invention.
Figure 2:
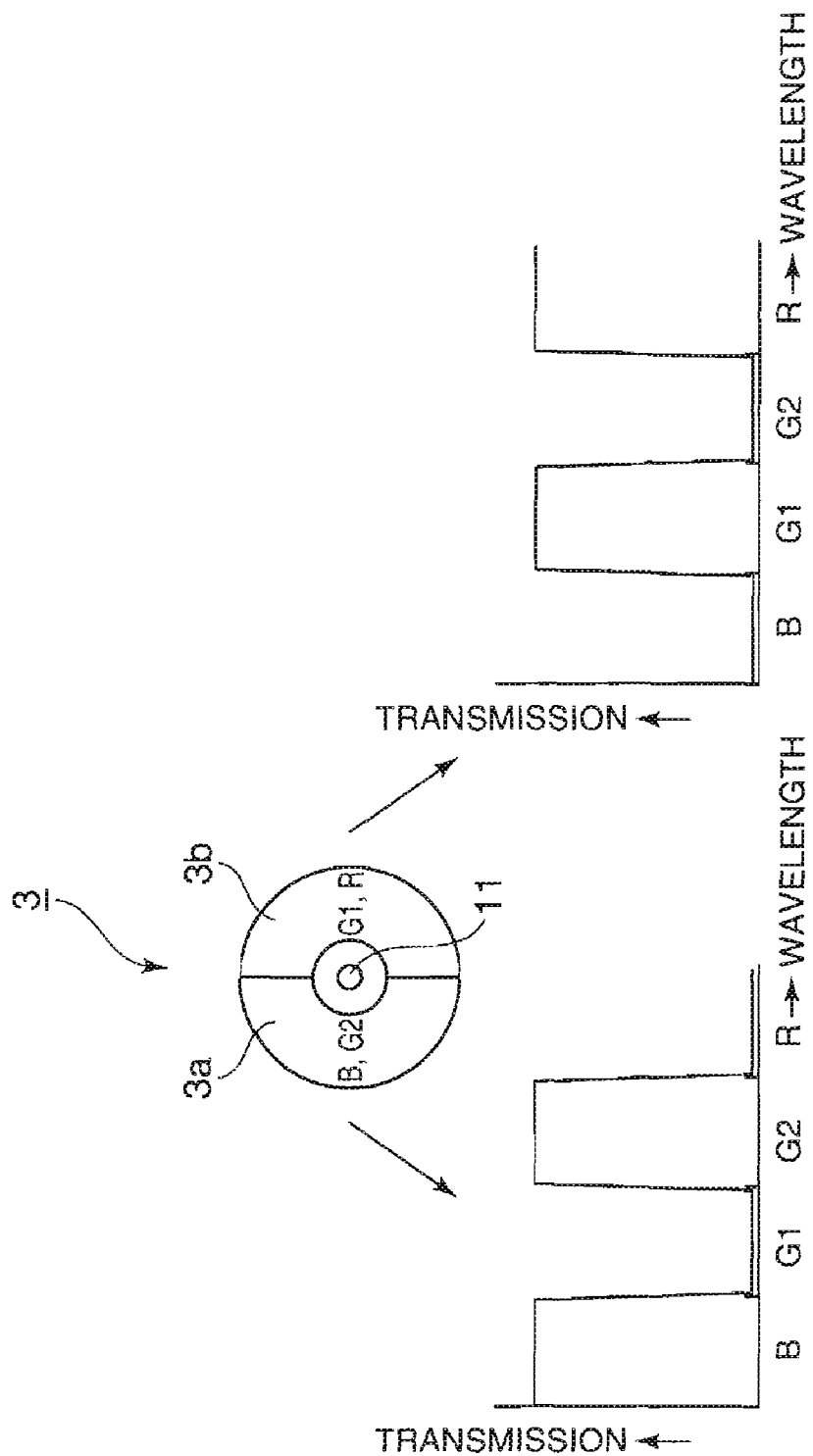
FIG. 2 is a diagram showing the spectral characteristic of a rotating color filter of the projector according to the same.
Figure 3:
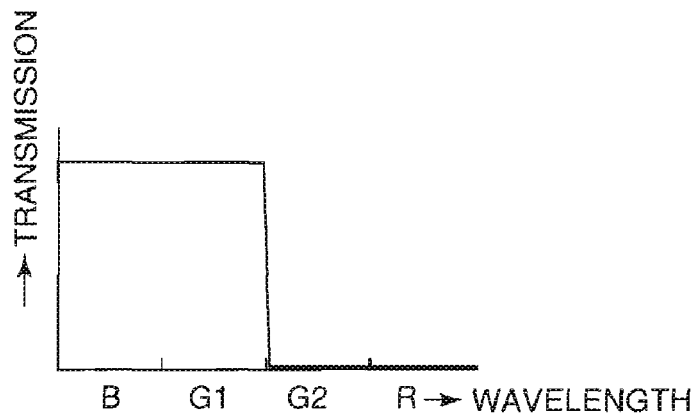
FIG. 3 is a diagram showing the spectral characteristic of a dichroic mirror of the projector according to the same.
Figures 4A, 4B:
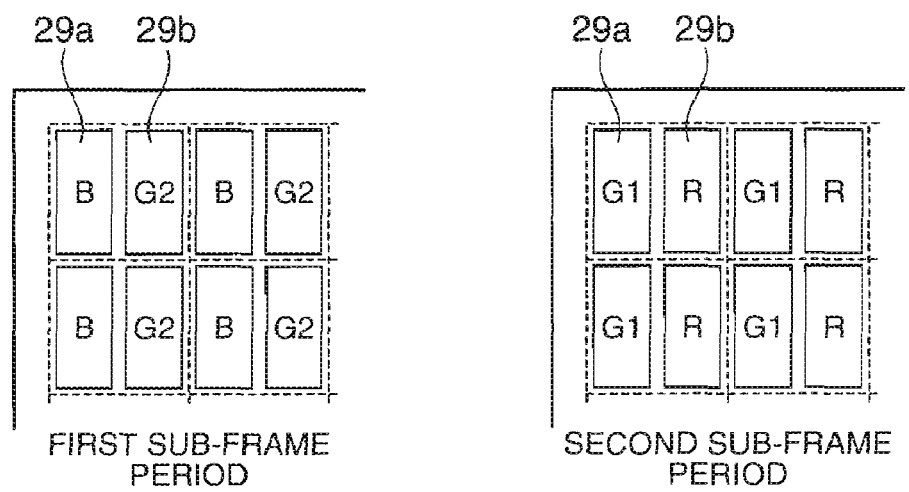
FIGS. 4A and 4B are diagrams each showing a pixel configuration of a liquid crystal panel of the projector according to the same.
Figure 5:
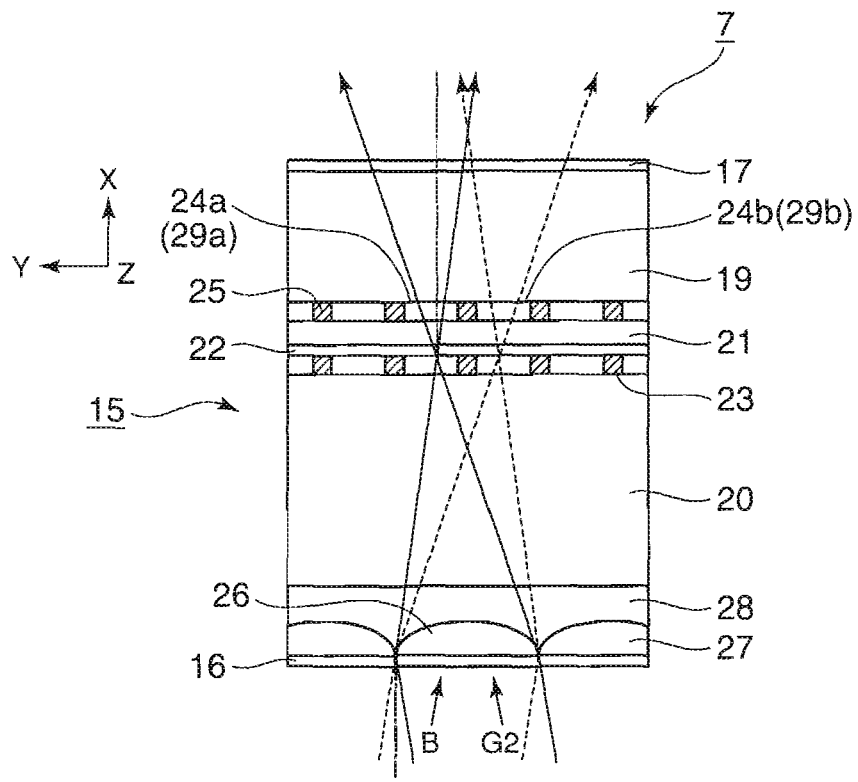
FIG. 5 is a cross-sectional view of a liquid crystal light valve according to the same.

FIG. 1 is a schematic configuration diagram of the projector according to the present embodiment; FIG. 2 is a diagram showing the spectral characteristic of a rotating color filter used in the projector according the same; FIG. 3 is a diagram showing the spectral characteristic of a dichroic mirror used in the projector according the same; FIGS. 4 A and 4B are diagrams showing the pixel configuration of a liquid crystal panel used in the projector according the same; and FIG. 5 is a cross-sectional view of a liquid crystal light valve used in the same. It should be noted that in the following drawings, each of sizes and positional relationships of the composing elements may be shown in a different scale size for providing an eye-friendly view of each of the composing elements.

As shown in FIG. 1, the projector 1 according to the present embodiment is schematically composed of a light source 2, a rotating color filter 3 (temporal colored light separating means), a rod integrator 4, a relay lens system 5, a spatial colored light separating optical system 6 (spatial colored light separating means), a liquid crystal light valve 7 (a spatial light modulation element), and a projection lens 8 (projection means). The light source 2 is provided with a lamp 9 emitting white light such as a high-pressure mercury vapor lamp, and emits irradiation light including four kinds of colored light (B light, G1 light, G2 light, and R light) different from each other in the wavelength range in the visible range. The irradiation light emitted from the lamp 9 is collected by a reflector 10, and then enters the rotating color filter 3 described later. It should be noted that for the light source, besides the high-pressure mercury vapor lamp, a metal halide lamp, a xenon lamp, a halogen lamp, an LED light source capable of emitting white light, an electroluminescence (EL) light source, and so on can also be used.

As shown in FIG. 2, the rotating color filter 3 is a disk-like plate with two semicircular filter areas 3a, 3b different in the spectral characteristic from each other, and is arranged rotatably around the rotational shaft 11. In the present embodiment, a first filter area 3a transmits the B light and the G2 light and reflects or absorbs the G1 light and the R light while the second filter area 3b transmits the G1 light and the R light and reflects or absorbs the B light and the G2 light, thus the rotating color filter 3 emits the light having a desired spectrum. Here, light existing in a wavelength range of about 380 nm through 495 nm is assumed as the B light existing in a wavelength range of about 495 mm through 525 nm is assumed as the G1 light, light existing in a wavelength range of about 525 nm through 585 nm is assumed as the G2 light, light existing in a wavelength range of about 585 nm through 780 nm is assumed as the R light, but these are not limitations. It should be noted, however, that taking the fact that luminosity factor of the human to the green light is high and the green light significantly influences the feeling of resolution in appreciating an image into consideration, it is desirable to divide the green light into two wavelength ranges to modulate each of them independently from the viewpoint of enhancement of resolution feeling.

According to the configuration described above, the light transmitted through the first filter area 3a out of the incident light to the rotating color filter 3 is emitted as composite light (hereinafter referred to as first composite light) of the B light and the G2 light, while the light transmitted through the second filter area 3b is emitted as composite light (hereinafter referred to as second composite light) of the G1 light and the R light. Further, by appropriately controlling the rotational speed of the rotating color filter 3, these composite light beams are switched in accordance with display timing in a liquid crystal light valve 7 described later. Specifically, by rotating the rotating color filter 3 one revolution every 1/60 second one frame period), the first and the second composite light beams are emitted from the rotating color filter 3 alternately every 1/120 second (one sub-frame period). For example, the first composite light beam is emitted in the first sub-frame period, and the second composite light beam is emitted in the second sub-frame period.

The light beam emitted from the rotating color filter 3 enters the spatial colored light separating optical system 6 via the rod integrator 4 and, the first and the second relay lenses 5a, 5b forming the relay lens system 5. The rod integrator 4 homogenizes the intensity distribution of the light emitted from the rotating color filter 3, and the first and the second relay lenses 5a, 5b transmit the light beam having the light intensity distribution at the emission end of the rod integrator 4 onto the liquid crystal light valve 7 described later. It should be noted that the third relay lens 5c disposed on the emission side of the spatial colored light separating optical system 6 can be disposed on the entrance side of the spatial colored light separating optical system 6. In that case, an advantage that the separation performance of the colored light in the spatial colored light separating optical system 6 can easily be improved is obtained. This is because the higher the parallelism of the light entering the spatial colored light separating optical system 6 is, the easier the spectral characteristic of the spatial colored light separating optical system 6 is improved.

The spatial colored light separating optical system 6 has a reflecting element composed of one dichroic mirror 13 and one reflecting mirror 14, and has a function of further separating each of the first and the second composite light entering the reflecting element into two kinds of colored light spatially, and emitting them. The dichroic mirror 13 and the reflecting mirror 14 are disposed in fan-like fashion so as to be in a non-parallel condition to each other. More specifically, assuming a virtual axis AX (illustrated with a chain double-dashed line) at an angle of 45 degree with the center axis of the incident light beam on the X-Y plane, the dichroic mirror 13 and the reflecting mirror 14 are disposed in the non-parallel condition (forming an angle with each other) to each other about the axis of symmetry of the virtual axis AX. In the present embodiment, the distance between the two mirrors 13, 14 is shorter at the end of the nearer side (+X, +Y side) to the liquid crystal light valve 7, and is expanded at the end of the further side (−X, −Y side) from the liquid crystal light valve 7. The dichroic mirror 13, as described later, reflects the light in a specific wavelength range and transmits the light in the other wavelength range, thereby spatially separating the both parties from each other. Although the light transmitted through the dichroic mirror 13 is reflected by the reflecting mirror 14, and proceeds in a similar direction to that of the light reflected by the dichroic mirror 13, the reflected light from the dichroic mirror 13 and the reflected light from the reflecting mirror 14 are in conditions slightly different in the emission direction from each other. It should be noted that the reflecting mirror 14 can be a dichroic mirror for reflecting the light in a specific wavelength range.

As shown in FIG. 3, the dichroic mirror 13 has a spectral characteristic of transmitting the B light and the G1 light while reflecting the G2 light and the R light. Therefore, for example, out of the first composite light entering the spatial colored light separating optical system 6 during the first sub-frame period, the B light is transmitted through the dichroic mirror 13 and reflected by the reflecting mirror 14 while the G2 lights is reflected by the dichroic mirror 13. Accordingly, the first composite light is separated into the B light and the G2 light with emission directions different from each other, and emitted respectively. Similarly, during the second sub-frame period, since the G1 light is transmitted through the dichroic mirror 13 and reflected by the reflecting mirror 14 while the R light is reflected by the dichroic mirror 13, the second composite light is also separated into the G1 light and the R light with emission directions different from each other, and emitted respectively. Therefore, the two kinds of colored light thus separated enter the display surface of the liquid crystal light valve 7 at slightly different angles from each other. It should be noted that the intersection angle (non-parallel arrangement of the both parties) between the dichroic mirror 13 and the reflecting mirror 14 is set in accordance with the arrangement of two sub-pixels corresponding to one microlens in the liquid crystal light valve 7 described later.

The liquid crystal light valve 7 of the present embodiment is a two-color-modulation liquid crystal light valve having a transmissive liquid crystal panel for modulating the two kinds of colored light entering at slightly different angles from each other independently based on the image information from the outside to form an optical image, and emitting the modulated light beam from the opposite side to the entrance side. Further, the liquid crystal light valve 7 is composed of a transmissive liquid crystal panel 15 and polarization plates 16, 17 disposed on the light entrance side and the light emission side, respectively. The transmissive liquid crystal panel is provided with one microlens for every pair of sub-pixels disposed adjacent to each other, and is capable of modulating the two kinds of colored light entering a corresponding pair of sub-pixels at angles slightly different from each other independently and every sub-frame period of 1/120 second.

Specifically, as shown in FIG. 5, twisted nematic (TN) liquid crystal 21 is encapsulated between a pair of transparent substrates 19, 20 made of glass or the like, the opposed substrate 20 is provided with a common electrode 22, a black matrix 23 for blocking unnecessary light, and so on formed thereon, while the TFT substrate 19 is provided with pairs of sub-pixel electrodes 24a, 24b, thin film transistors 25 (TFT)

as switching elements, and so on formed thereon. When a voltage is applied on each of the sub-pixel electrodes 24a, 24b via the TFT 25, an electric field is applied to the liquid crystal 21 held between each of the sub-pixel electrodes 74a, 24b and the common electrodes 22, and the liquid crystal 21 is driven. It should be noted that the liquid crystal 21 is not limited to the TN type liquid crystal, but a homogeneous alignment and a homeotropic alignment, a ferroelectric and an antiferroelectric liquid crystal, and so on can also be used as long as it can modulate every sub-frame period of $1/120$ second.

Further, the opposed substrate 20 is provided with a microlens array 27 on the entrance side, which has a plurality of microlenses 26 disposed in a matrix. Each of the microlenses 26 is manufactured by forming a lens shape on the surface of the glass plate by etching or the like, and is bonded to the opposed substrate 20 via a resin layer 23 (an adhesive) having a different refraction index from that of the glass plate provided with the microlens array 27. The microlens array 27 respectively collects the two kinds of colored light (e.g., the B light (broken line), the G2 light (solid line)) separated in the emission direction by the spatial colored light separating optical system 6, and inputs them to the pairs of sub-pixels 29a, 29b disposed in the conditions spatially separated from each other. Specifically, the microlens array 27 is arranged so that one of the microlenses 26 corresponds to one of the pairs of sub-pixels 29a, 29b arranged in the Y direction. Therefore, the direction along which the pairs of sub-pixels 29a, 29b are arranged is set to the direction in which the emission direction of the colored light is separated in the spatial colored light separating optical system 6. In this case, the size of the microlens 26 in the Y direction is arranged to be substantially equal to the total size of the pair of sub-pixels 29a, 29b in the Y direction, and the size of the microlens 26 in the Z direction is arranged to be substantially equal to the size of the sub-pixels 29a, 29b in the Z direction. Further, on the light entrance side of the opposed substrate 20 and on the light emission side of the TFT substrate 19, there are disposed polarization plates 16, 17, respectively.

The four kinds of colored light entering the liquid crystal light valve 7 are modulated independently both spatially and temporally and form an optical image based on the image information from the outside. Specifically, as shown in FIG. 4A, in the first sub-frame period, the B light and the G2 light separated from the first composite light by the spatial colored light separating optical system 6 simultaneously enter the liquid crystal light valve 7, the B light and the G2 light separately enter and modulated by the first sub pixel 29a (the sub-pixel on the left in FIG. 4A) and the second sub-pixel 29b (the sub-pixel on the right in FIG. 4A) respectively out of the pair of sub-pixels, to form a first image composed of the B light and the G2 light. Similarly, in the second sub-frame period, as shown in FIG. 4B, the G1 light and the R light separately enter and modulated by the first sub-pixel 29a and the second sub-pixel 29b, respectively, to form a second image composed of the G1 light and the R light. Further, the first image and the second image are formed (displayed) alternatively every one sub-frame period of $1/120$ second.

Although the example in which the B light and the G2 light enter the first sub-pixel 29a and the second sub-pixel 29b respectively in the first sub-frame period while the G1 light and the R light enter the first sub-pixel 29a and the second sub-pixel 29b respectively in the second sub-frame period is cited here, there are a number of combinations of the colored light between the sub-frames and the sub-pixels other than the above, and the combinations can be set with freedom by changing the spectral characteristics of the rotating color filter 3 and the dichroic mirror 13. However, in consideration of the luminosity characteristic of the human, since the green light is dominant with respect to the luminosity, if the G1 light and the G2 light are assigned to the same sub-pixels, it is difficult to obtain the advantage of improvement in the resolution, and by assigning the G1 light and the G2 light to different sub-pixels as in the present embodiment, the sufficient advantage of improving the resolution can be obtained.

Further, if the high-pressure mercury vapor lamp is used as the light source 2, the high-pressure mercury lamp has the tendency of having maximum amount of green light of all the colored light. Therefore, if the G1 light and the G2 light are assigned to the same sub-frame period and the B light and the R light are assigned to the other sub-frame period, the variation in the amount of light becomes large between sub-frames, which might cause the flicker (blink in the brightness), and is not preferable. Therefore, in order for preventing the flicker, it is preferable to assign the G1 light and the G2 light to the different sub-frame periods. As described above, from the viewpoints of improvement of resolution and prevention of the flicker, the combination shown in FIGS. 4A and 4B is the best suited to the present embodiment.

Further, the optical images formed by the liquid crystal light valve 7 are projected on a screen not shown by the projection lens 8 alternately every $1/120$ second. The images alternately projected every $1/120$ second are not separately viewed in the time unit of $1/120$ second in consideration of the visual characteristic of the human, but are viewed as integration of the images, and accordingly, viewed as a color image composed of four kinds of colored light.

In the projector 1 according to the present embodiment, the expansion of the expressible color gamut can be achieved by using four primary colors of light of the B light, the G1 light, the G2 light, and the R light for color display, and at the same time, since only one liquid crystal light valve is required for four primary colors of light, downsizing and cost reduction of the device can be realized.

Further, in the case of the present embodiment, the spectral characteristic of the dichroic mirror 13 is set to reflect the G2 light and the R light. If the high-pressure mercury vapor lamp is used as the light source 2, the high-pressure mercury lamp generally has a tendency of having the weakest intensity of the R light of all other colors of light. On the other hand, since the dichroic mirror generally has a property of having a smaller light loss of the reflected light than the transmitted light, by adopting the configuration for reflecting the R light by the dichroic mirror 13, the loss of the R light originally having a small intensity becomes smaller, thus easily balancing the intensity of light among other colors of light, and as a result, a bright image can be obtained.

Figure 6:
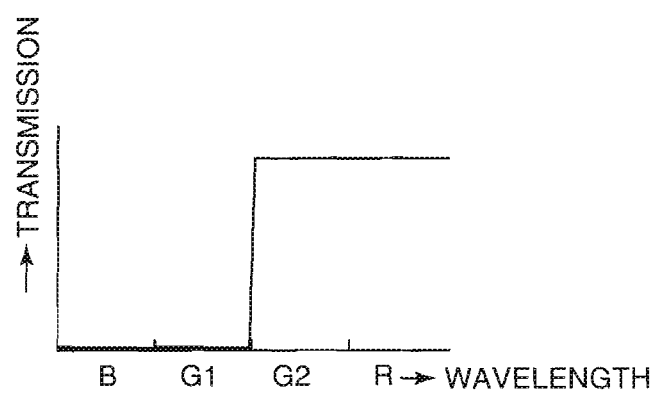
FIG. 6 is a diagram showing another example of the spectral characteristic of a dichroic mirror of the same.
Figure 7A:
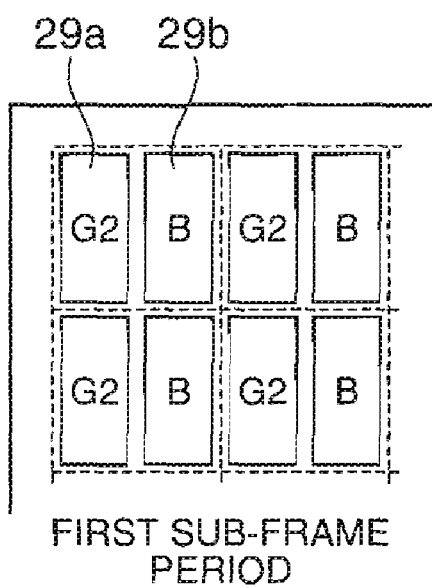
FIGS. 7A and 7B are diagrams showing another example of the pixel configuration of the liquid crystal panel of the same.
Figure 7B:
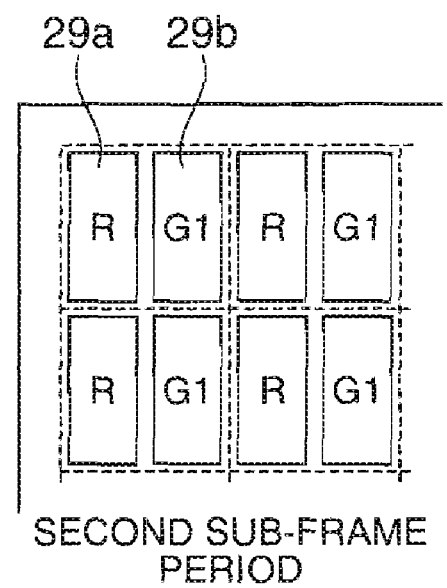

On the other hand, if the xenon lamp or the halogen lamp is used as the light source 2, these lamps are generally apt to be lacking of the intensity of the B (blue) light or the G1 (bluish green) light. Therefore, in this case, the spectral characteristic of the dichroic mirror 13 is preferably set so as to reflect the B light and the G1 light and to transmit the G2 light and the R light as shown in FIG. 6. Further, in this case, the assignment of each colored light to the sub-pixels is, as shown in FIGS. 7A and 7B, preferably arranged so that the G2 light and the B light respectively enter the first sub-pixel 29a and the second sub-pixel 29b in the first sub-frame period, and the R light and the G1 light respectively enter the first sub-pixel 29a and the second sub-pixel 29b in the second sub-frame period. By thus arranging, as described above, since the G1 light and the G2 light are assigned to the different sub-pixels, a sufficient advantage of improving the resolution can be obtained, and at the same time, since the G2 light and the R light having relatively strong intensity are assigned to the different sub-frame periods, the flicker can be suppressed to prevent the image quality from being degraded.

It should be noted that some people may think that in order for realizing the display using four primary colors of light with a single liquid crystal light valve, it is possible to simply divide the one frame period into four (e.g., using a rotating color filter having four color filter areas) instead of using the spatial colored light separating optical system 6 as used in the present embodiment to independently modulating each of the colored light. However, since the sub-frame period becomes shorter (in this case the sub-frame period becomes $\frac{1}{240}$ second) in accordance with increase in the number of colors of light to be modulated in a time-sharing manner, and there is a limitation on the response speed of the liquid crystal light valve, in this method, it is difficult to sufficiently assure the number of gradation levels per sub-frame period, thus causing the problems that smooth gradation expression can hardly be realized, that a false contour, which should not exist under normal circumstances, is easily caused, and that the degradation in the image quality such as drop of brightness of the projected image is caused. In contrast, according to the configuration of the present embodiment, since the sub-frame period is set to be $\frac{1}{120}$ second (about 8.3 millisecond) to which the liquid crystal can sufficiently respond, the light modulation accompanied with a gradation property can fully be performed, thus the smooth gradation property can be realized without causing drop of brightness.

Second Embodiment

Hereinafter, a second embodiment of the invention will be explained with reference to FIGS. 8, 9A, and 9B.

The basic configuration of the projector according to the present embodiment is similar to the projector according to the first embodiment, and is different in the point of providing a polarization state switching optical system as the temporal colored light separating means instead of the rotating color filter.

Figure 8:
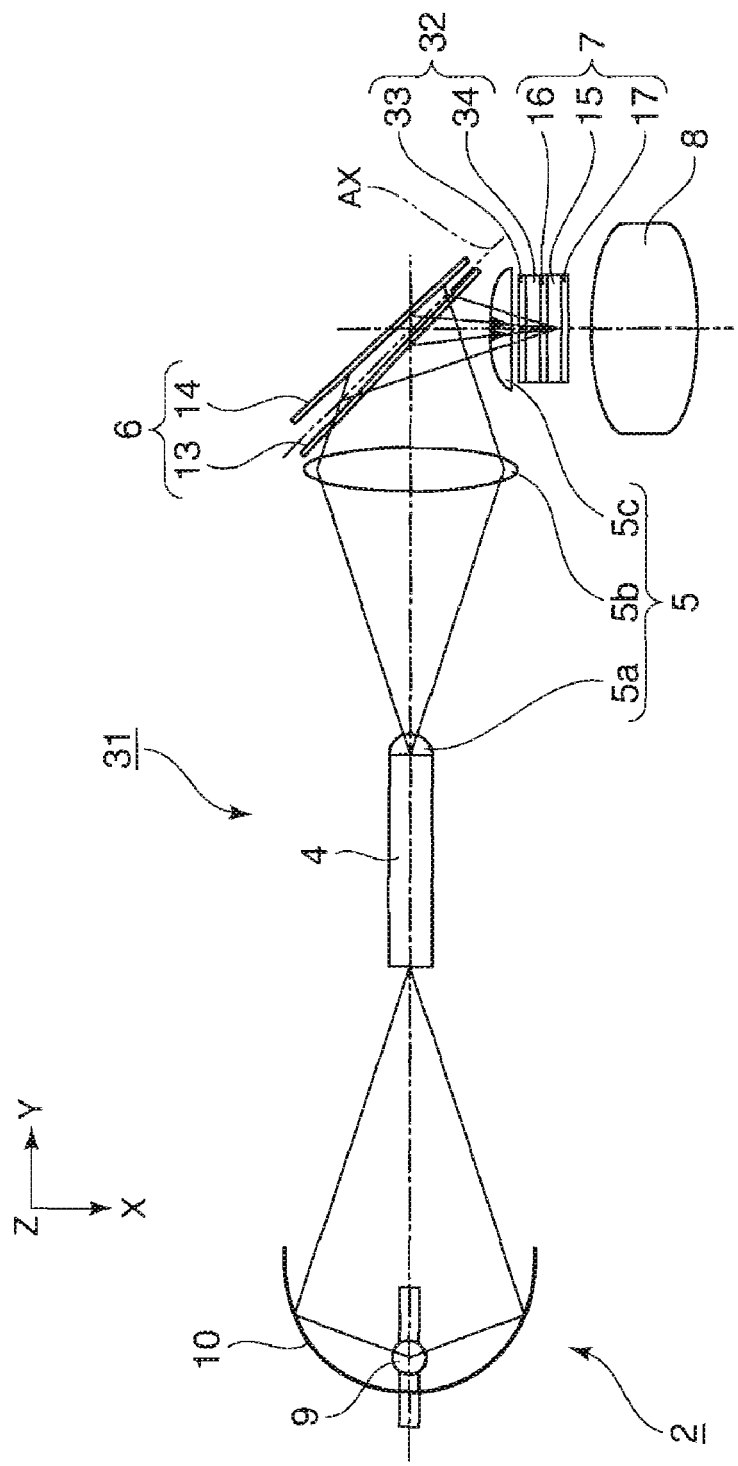
FIG. 8 is a schematic configuration diagram of a projector according to a second embodiment of the invention.
Figure 9:
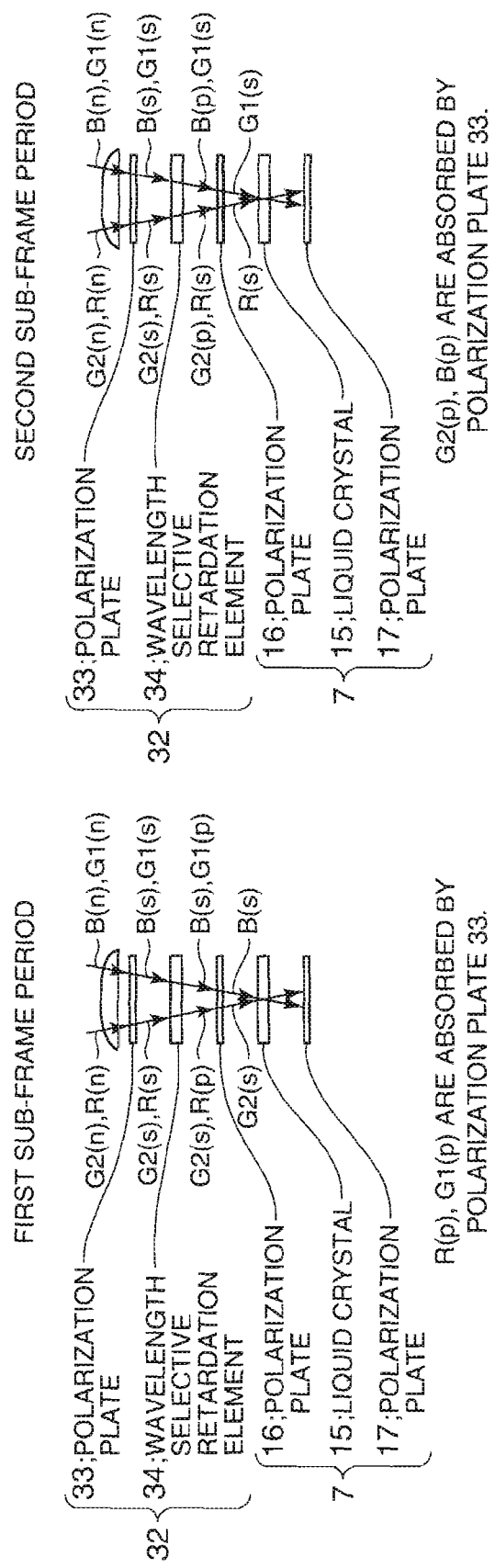
FIGS. 9A and 9B are diagrams showing the configuration and the function of a polarization state switching optical system of the projector according to the same.

FIG. 8 is a schematic configuration diagram of the projector according to the present embodiment, and FIGS. 9A and 9B are diagrams showing the configuration and the function of the polarization state switching optical system used in the projector according to the same. It should be rioted that in FIGS. 8, 9A, and 9B, the common configuration elements to the drawings used in the first embodiment are denoted with the same reference numerals, and detailed explanations therefor will be omitted.

In the case with the projector 31 of the present embodiment, as shown in FIG. 8, there is a configuration in which the irradiation light emitted from the light source 2 and including four kinds of colored light is collected by the reflector 10, and enters the polarization state switching optical system 32 (the temporal colored light separating means) via the rod integrator 4, the relay lens system 5, and the spatial colored light separating optical system 6. The spectral characteristic of the dichroic mirror 13 forming the spatial colored light separating optical system 6 is the same as in the first embodiment (as shown in FIG. 3). However, in the present embodiment, since the rotating color filter 3 used in the first embodiment is not provided, at the time point when the irradiation light enters the spatial colored light separating optical system 6, the four kinds of colored light are still mixed, and therefore, the state of the colored light separation in the spatial colored light separating optical system 6 is different from the first embodiment. Specifically, the light from the light source 2 entering the spatial colored light separating optical system 6 is separated into composite light (hereinafter referred to as first composite light) composed of the B light and the G1 light transmitted through the dichroic mirror 13 and reflected by the reflection mirror 14, and composite light (hereinafter referred to as second composite light) composed of the G2 light and the R light reflected by the dichroic mirror 13, and enters the polarization state switching optical system 32 as the first composite light and the second composite light different in the emission direction from each other.

As shown in FIGS. 8, 9A, and 9B, the polarization state switching optical system 32 is composed of a polarization plate 33 and a wavelength selective retardation element 34. The wavelength selective retardation element 34 has a function capable of converting (e.g., converting P-polarized light into S-polarized light or S-polarized light into P-polarized light in the light in a specific wavelength range) the polarization state of the incident light at a desired timing in a wavelength selective manner (e.g., marketed from ColorLink, inc. with a product name of "ColorSwitchR®"). Particularly in the case of the present embodiment, what is capable of converting the polarization state of the incident light every $\frac{1}{120}$ second is used as the wavelength selective retardation element 34. Further, since it is necessary to input specifically polarized light to the wavelength selective retardation element 34, the polarization plate 33 is disposed on the entrance side of the wavelength selective retardation element 34. The polarization plate 33 has an optical characteristic of transmitting the S—polarized light and absorbing or reflecting the P-polarized light. It should be noted that a polarization conversion element for converting unpolarized light into specifically linear polarized light can be disposed instead of or in addition to the polarization plate 33. It should be noted that in FIGS. 9A and 9B, subscripts in parentheses following the reference characters denoting colored light such as B. G1, G2, or R denote unpolarized light with n, S-polarized light with s, P-polarized light with p, respectively.

From the wavelength selective retardation element 34, one colored light out of the first composite light and one colored light out of the second composite light are emitted with the polarization state converted every $\frac{1}{120}$ second. For example, after each of the colored light is converted by the polarization plate 33 from the random polarized light into the S-polarized light, as shown in FIG. 9A, the G1 light out of the first composite light and the R light out of the second composite light are converted from the S-polarized light into the P-polarized light in the first sub-frame period (the B light and the G2 light remain unconverted as the S-polarized light). Then, in the second sub-frame period, as shown in FIG. 9B, the B light out of the first composite light and the G2 light out of the second composite light are converted from the S-polarized light into the P-polarized light (the G1 light and the R light remain unconverted as the S-polarized light).

As described above, the first and the second composite light including the colored light converted in the polarization state by the wavelength selective retardation element 34 enters the polarization plate 16 on the entrance side of the liquid crystal light valve 7, and separated into the colored light transmitted through the polarization plate 16 and the colored light absorbed (blocked) by the polarization plate 16 in accordance with the relationship with the polarization axis of the polarization plate 16. In this case, the polarization plate 16 is set to have the optical characteristic of, for example, transmitting the S-polarized light and absorbing the P-polarized light. Thus, in the first sub-frame period, as shown in FIG. 9A, the B light out of the first composite light and the G2 light out of the second composite light are transmitted through the polarization plate 16 and enter the liquid crystal panel 15, but the G1 light out of the first composite light and the R light out of the second composite light are blocked by the polarization plate 16 and do not enter the liquid crystal panel 15. On the contrary, in the second sub-frame period, as shown in FIG. 9B, the G1 light out of the first composite light and the R light out of the second composite light are transmitted through the polarization plate 16 and enter the liquid crystal panel 15, but the B light out of the first composite light and the G2 light out of the second composite light are blocked by the polarization plate 16 and do not enter the liquid crystal panel 15. As described above, by switching the polarization state of each of the colored light every 1/120 second using the wavelength selective retardation element 34, the colored light entering the liquid crystal light valve 7 can be sequentially switched every sub-frame period.

It should be noted that the behavior of each colored light entering the liquid crystal light valve 7 and the combination and the disposition of the colored light in the sub-frame period and the sub-pixels are similar to the case with the first embodiment.

In also the projector 31 of the present embodiment, similar advantages to the advantage of the first embodiment that the expansion of the expressible color gamut can be realized, and at the same time, the downsizing and cost reduction of the device can be realized can be obtained. Further, by adopting the combination and disposition of the colored light similar to the case with the first embodiment, the advantage of achieving the enhancement of the resolution and reduction of the flicker can similarly be obtained. It should be noted that in the case of using the liquid crystal panel requiring the polarized light as the irradiation light in displaying an image as the spatial light modulation element, by adopting the configuration of switching the colored light entering the liquid crystal panel in accordance with the polarization state as in the present embodiment, the light efficiency can easily be enhanced, and the brightness of the projected image can easily be improved.

Third Embodiment

Hereinafter, a third embodiment of the invention will be explained with reference to FIGS. 10, and 11A through 11C.

In contrast to the first and the second embodiment using the so-called white light source, namely the light source having emission spectrum throughout the entire visible range such as the high-pressure mercury vapor lamp as the light source, the projector according to the present embodiment has a difference of using so-called monochromatic light sources formed of LED light sources instead of the white light source.

Figure 10:
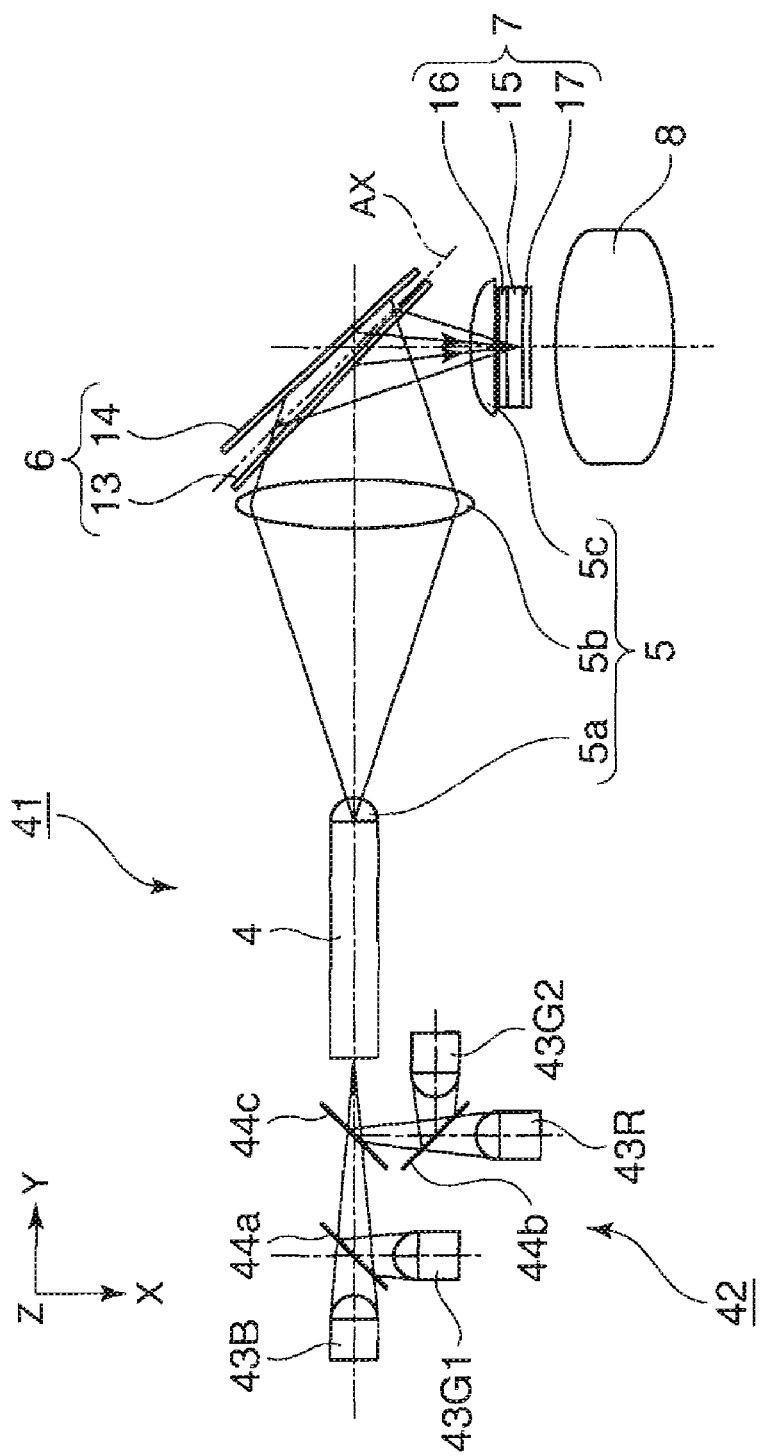
FIG. 10 is a schematic configuration diagram of a projector according to a third embodiment of the invention.
Figure 11A:
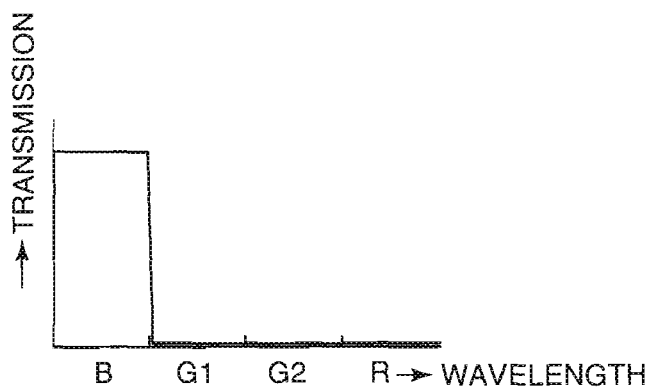
FIGS. 11A through 11C are diagrams showing the spectral characteristic of a dichroic mirror of the projector according to the same.
Figure 11B:
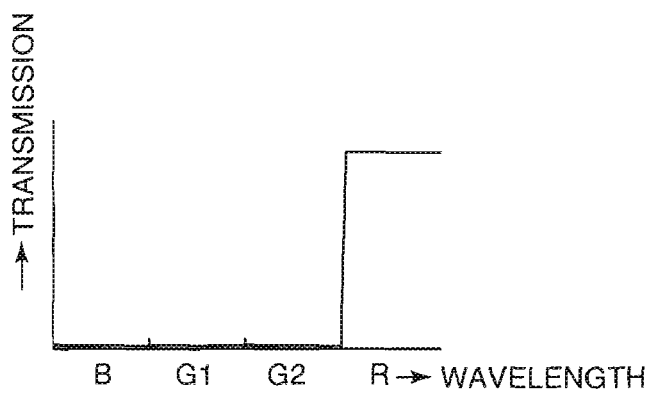
Figure 11C:
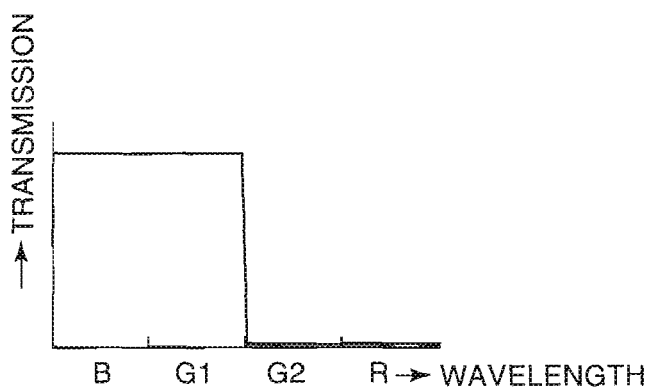

FIG. 10 is a schematic configuration diagram of the projector according to the present embodiment, and FIGS. 11A through 11C are diagrams showing the spectral characteristic of the dichroic mirror used in the projector according to the same. It should be noted that in FIG. 10, the common configuration elements to the drawings used in the first embodiment are denoted with the same reference numerals, and detailed explanations therefor will be omitted.

As shown in FIG. 10, the projector 41 according to the present embodiment is schematically composed of a light source section 42, a rod integrator 4, a relay lens system 5, a spatial colored light separating optical system 6, a liquid crystal light valve 7, and a projection lens 8 the light source section 42 includes four LED light sources 43B, 43G1, 43G2, and 43R capable of emitting monochromatic light with different wavelength ranges from each other, and three dichroic mirrors 44a, 44b, and 44c for combining the colored light from each of the LED light sources. The four LED light sources include the B-LED light source 43B (a first light source) for emitting the B light, the G1-LED light source 43G1 (a third light source) for emitting the G1 light, the G2-LED light source 43G2 (a second light source) for emitting the G2 light, and the R-LED light source 43 R (a fourth light source) for emitting the R light. The wavelength range of each of the colored light is common to the first embodiment. It should be noted that a laser light source or an EL light source can also be used besides the LED light source as long as the light source is capable of emitting monochromatic light.

Further, the first dichroic mirror 44a is disposed at the position where the light paths of the B light and the G1 light respectively emitted from the B-LED light source 43B and the G1-LED light source 43G1 intersect with each other; the second dichroic mirror 44b is disposed at the position where the light paths of the G2 light and the R light respectively emitted from the G2-LED light source 43G2 and the R-LED light source 43R intersect with each other; and the third dichroic mirror 44c is disposed at the position where the light paths of the B light and the R light respectively emitted from the B-LED light source 43B and the R-LED light source 43R intersect with each other.

The spectral characteristics of the respective dichroic mirrors 44a, 44b, and 44c are as shown in FIGS. 11A, 11B, and 11C, and the first dichroic mirror 44a has a spectral characteristic of transmitting the B light and reflecting at least the G1 light as shown in FIG. 11A. The second dichroic mirror 44b has a spectral characteristic of transmitting the R light and reflecting at least the G2 light as shown in FIG. 11B. As shown in FIG. 11C, the third dichroic mirror 44c has a spectral characteristic of transmitting the B light and the G1 light while reflecting the G2 light and the R light. According to the first through the third dichroic mirrors 44a, 44b, and 44c having the above spectral characteristics, the colored light emitted from the four LED light sources 43B, 43G1, 43G2, and 43R is combined so as to have a single light path.

As is understood from the fact that the ratio of the amounts of light of the blue light, the green light, and the red light for displaying a color image is typically set to 1:6:3, the amount of the green light needs to be large compared to other colored light. Therefore, in the case in which a plurality of light sources different in the emission wavelength range are used, if the emission efficiency is substantially the same among the light sources, the amount of light of the light source (the G1-LED light source 43G1 and the G2-LED light source 43G2 in the present embodiment) emitting the green light needs to be set larger. Therefore, in the present embodiments the colored light from the G1-LED light source 43G1 or the G2-LED light source 43G2 is combined with other colored light in the form of reflecting the colored light from the G1-LED light source 43G1 or the G2-LED light source 43G2 by the respective dichroic mirrors 44a, 44b, and 44c. Thus, the reflection efficiency of the colored light emitted from the G1-LED light source 43G1 or the G2-LED light source 43G2 in the dichroic mirror can be improved, and accordingly, the light intensity can easily be balanced with other colored light, and as a result, a bright image can be obtained. It should be noted that in the case in which the difference in the emission efficiency is large among the light sources, the colored light to be reflected by the dichroic mirror is not limited to the green light, but it is preferable that the configuration of the colored light from the monochromic light sources to each of the dichroic mirrors is set taking the light loss in the dichroic mirrors into consideration, so that it becomes easy to balance the light intensity with other colored light while minimizing the light loss.

In this case, all of the four LED light sources 43B, 43G1, 43G2, and 43R do not emit light simultaneously, but the LED light source to emit light is switched every $1/120$ second (corresponding to one sub-frame period) and the combination of the LED light sources to emit light is also changed. In other words, each of the LED light sources do not emit light continuously in terms of time, but intermittently lights in such a manner that it emits light for $1/120$ second at the longest and then stops emitting light for $1/120$ second at the shortest. For example, in the first sub-frame period, the B-LED light source 43B and the G2-LED light source 43G2 emit light simultaneously to generate the composite light including the B light and the G2 light, and in the second sub-frame period, the G1-LED light source 43G1 and the R-LED light source 43R emit light simultaneously to generate the composite light including the G1 light and the R light. Then, each of the composite light enters the spatial colored light separating optical system 6 via the rod integrator 4 and the relay lens system 5. Further, the spectral characteristic of the dichroic mirror 13 forming the spatial colored light separating optical system 6 is the same as in the first embodiment (as shown in FIG. 3).

Then, each of the colored light entering the spatial colored light separating optical system 6 is separated into the B light and the G2 light, or the G1 light and the R light different from each other in the emission direction, and is emitted therefrom and then enters the liquid crystal light valve 7. From then on, the behavior of each colored light after entering the liquid crystal light valve 7 and the combination and the disposition of the colored light in the sub-frame period and the sub-pixels are similar to the case with the first embodiment.

In also the projector 41 of the present embodiment, similar advantages to the advantages of the first and the second embodiments that the expansion of the expressible color gamut can be realized, and at the same time, the downsizing and cost reduction of the device can be realized can be obtained. Further, by adopting the combination and disposition of the colored light similar to the case with the first and the second embodiments, the advantage of achieving the enhancement of the resolution and reduction of the flicker can similarly be obtained.

Further, as a function and an advantage specific to the present embodiment, the point that two kinds of composite light can be generated every sub-frame period alternately only by alternately emitting light from the four LED light sources 43B, 43G1, 43G2, and 43R two by two can be cited. Therefore, the temporal colored light separating optical system such as the rotating color filter or the wavelength selective retardation element used in the first and the second embodiments can be eliminated, thus further downsizing and cost reduction of the device can be achieved. Further, since the four LED light sources 43B, 43G1, 43G2, and 43R with different emission wavelength from each other are used, the combination of the colored light in each sub-frame period can be set with freedom. Thus, since the dichroic mirror 13 of the spatial colored light separating optical system 6 intervening therebetween can be set to have a spectral characteristic with which the manufacture thereof becomes easy, an advantage can be obtained that improvement in performance and cost reduction of the spatial colored light separating optical system 6 can easily be achieved. Further, since the plurality of LED light sources 43B, 43G1, 43G2, and 43R corresponding to the emission wavelength are used, these light sources do not need to always emit light, and it is enough to make the light sources only emit light intermittently, it is easy to increase the emission intensity, thus a bright projection display can be realized.

Fourth Embodiment

Hereinafter, a fourth embodiment of the invention will be explained with reference to FIG. 12.

The projector according to the present embodiment is similar to the third embodiment in the point of using the monochromatic light sources formed of the LED light sources, but is different from the third embodiment in the point of having a configuration of not using the spatial colored light separating optical system.

Figure 12:
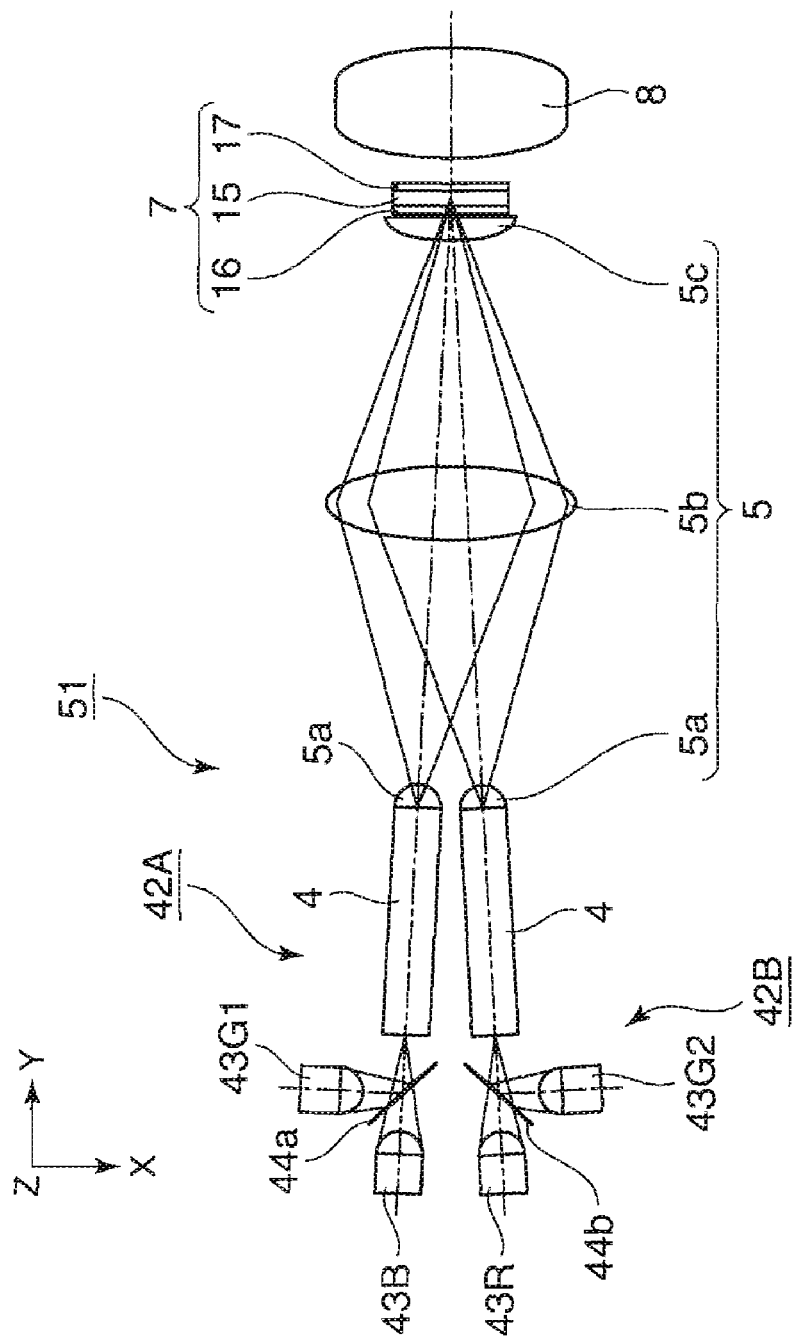
FIG. 12 is a schematic configuration diagram of a projector according to a fourth embodiment of the invention.

FIG. 12 is a schematic configuration diagram of the projector according to the present embodiment. It should be noted that in FIG. 12, the common configuration elements to the drawings used in the first embodiment are denoted with the same reference numerals, and detailed explanations therefor will be omitted.

As shown in FIG. 12, the projector 51 of the present embodiment is schematically composed of two sets of light source sections 42A, 42B including the LED light sources 43B, 43G1, 43G2, and 43R, the dichroic mirrors 44a, 44b, the rod integrators 4, the relay lens system 5, the liquid crystal light valve 7, and the projection lens 8. The light source sections 42A, 42B each includes two LED light sources 43B, 43G1 (43G2, 43R) capable of emitting monochromatic light with different wavelength ranges from each other, one dichroic mirrors 44a (44b) for combining the colored light from the two LED light sources, and one rod integrator 4. The two LED light sources of each of the light source sections are the LED light sources emitting light in the different sub-frame periods from each other, and the first light source section 42A includes the B-LED light source 43B (the first light source) and the G1-LED light source 43G1 (the third light source) while the second light source section 42B includes the G2-LED light source 43G2 (the second light source) and the R-LED light source 43R (the fourth light source). In the points of the wavelength ranges of the colored light, and that the laser light source or the EL light source can also be used therefor besides the LED light sources, the present embodiment is similar to the third embodiment. Further, the spectral characteristics of the two dichroic mirrors 44a, 44b are the same as in the third embodiment (as shown in FIGS. 11A to 11C).

Further, in the first light source section 42A, the first dichroic mirror 44a is disposed at the position where the light paths of the B light and the G1 light respectively emitted from the B-LED light source 43B and the G1-LED light source 43G1 intersect with each other. Similarly, in the second light source section 42B, the second dichroic mirror 44b is disposed at the position where the light paths of the G2 light and the R light respectively emitted from the G2-LED light source 43G2 and the R-LED light source 43R intersect with each other. By the dichroic mirrors 44a, 44b, the light paths of the B light and the G1 light are combined to form a single light path, and the light paths of the G2 light and the R light are combined to form a single light path.

Here, the LED light source to emit light is switched every $1/120$ second, and for example, in the first sub-frame period, the B-LED light source 43B and G2-LED light source 43G2 emit light simultaneously, and in the second sub-frame period, the G1-LED light source 43G1 and the R-LED light source 43R emit light simultaneously. Then, the colored light enters the respective rod integrators 4. In this case, the first and the second light source sections 42A, 44B are disposed in fan-like fashion so that the light paths of the two composite light beams each set to the respective one of the rod integrators 4 are arranged in the non-parallel condition to each other. In the present embodiment, the distance between the two light paths is narrower on the side (+Y side) near to the relay lens 5*b*, and the distance between the two light paths is expanded on the side (−Y side) far from the relay lens 5*b*. Therefore, the two kinds of colored light emitted simultaneously enter the two sub-pixels adjacent to each other of the liquid crystal light valve 7 at slightly different angles from each other. It should be noted that the intersection angle (non-parallel arrangement of the both parties) between the two light paths of the respective light source sections 42A, 42B is set in accordance with the arrangement of two sub-pixels corresponding to one microlens in the liquid crystal light valve 7. It should be noted that the behavior of each colored light entering the liquid crystal light valve 7 and the combination and the disposition of the colored light in the sub-frame period and the sub-pixels are similar to the case with the first embodiment.

In also the projector 51 of the present embodiment, similar advantages to the advantage of the above embodiments that the expansion of the expressible color gamut can be realized, and at the same time, the downsizing and cost reduction of the device can be realized can be obtained. Further, in the case of the present embodiment, since the light from each of the light source sections 42A, 42B can be input to the two sub-pixels of the liquid crystal light valve 7 only by disposing the two sets of light source sections 42A, 42B in a non-parallel condition, the spatial colored light separating optical system can be eliminated, thus further downsizing and cost reduction of the device can be achieved. Further, by adopting the combination and disposition of the colored light similar to the case with the above embodiments, the point of achieving the enhancement of the resolution and reduction of the flicker is also similar to the above embodiments.

It should be noted that the scope of the invention is not limited to the embodiments described above, but various modifications can be executed thereon within the range of the scope or the spirit of the invention. For example, a polarization conversion element for converting unpolarized light emitted from the light source into the polarized light corresponding to the entrance side polarization plate of the liquid crystal light valve can be provided between the light source and the spatial colored light separating means. Thus, the efficiency of the light can be enhanced. Further, since the dichroic mirror of the spatial colored light separating optical system generally has a higher reflectance of the S-polarized light than that of the P-polarized light, by providing the polarization conversion element for converting unpolarized light into S-polarized light, the light efficiency can further be enhanced.

Further, although in the above embodiments, the four kinds of colored light are assumed to be the B light, the G1 light, the G2 light, and the R light, they are not limited to these four colors, but various combinations can be considered in accordance with the application. From the view point of expansion of the color gamut, the combination of the B light, the G1 light, the G2 light, and the R light exemplified in the above embodiments is preferable, but from the view point of easiness of improvement of expression of a flesh color, for example, a combination of the B light, the G light, Or (orange) light, and R light is preferable, or from the view point of easiness of improvement of expression of medical images, a combination of the B light, the G light, R1 light (red light with shorter wavelength), and R2 light (red light with longer wavelength) is preferable, and something like that.

Further, the detailed part of the various configurations exemplified in the above embodiments are not limited to the above example but can be modified according to needs. For example, a lens array type integrator can also be used as the light intensity equalizing means disposed on the emission side of the light source instead of the rod integrator. Further, as the spatial light conversion element, not only the transmissive liquid crystal light valve, for example, a reflective liquid crystal light valve represented by a liquid crystal on silicon (LCOS) and so on can also be applied to the present embodiment of the invention. Further, not only to the projector but also to a direct-view type liquid crystal display using the backlight as the light source section, the present embodiment of the invention can also be applied.

The entire disclosure of Japanese Patent Application No. 2006-245758, filed Sep. 11, 2006 is expressly incorporated by reference herein.

What is claimed is:

1. A display device for modulating irradiation light with a spatial light modulation element to form an optical image, and displaying the optical image, comprising:
   a light source for emitting the irradiation light including four kinds of colored light having wavelength ranges within a visible range and different from each other;
   a temporal colored light separating section that temporally separates the irradiation light including the four kinds of colored light by the wavelength range to generate first irradiation light including first colored light and second colored light, and second irradiation light including third colored light and fourth colored light alternately and every sub-frame period;
   a spatial colored light separating section that spatially separates the colored light included in each of the first irradiation light and the second irradiation light to generate the first colored light and the second colored light in a first sub-frame period and to generate the third colored light and the fourth colored light in a second sub-frame period temporally adjacent to the first sub-frame period; and
   a spatial light modulation element provided with a plurality of sub-pixels, capable of independently modulating every sub-frame period one of a set of the first colored light and the second colored light and a set of the third colored light and the fourth colored light respectively entering two of the sub-pixels disposed adjacent to each other.

2. A display device for modulating irradiation light with a spatial light modulation element to form an optical image, and displaying the optical image, comprising:
   a light source for emitting the irradiation light including four kinds of colored light having wavelength ranges within a visible range and different from each other;
   a spatial colored light separating section that spatially separates the irradiation light including the four kinds of colored light to generate first irradiation light including first colored light and second colored light, and second irradiation light including third colored light and fourth colored light;
   temporal colored light separating section that converts the first colored light and the third colored light out of the four kinds of colored light into a first polarization state, and converts the second colored light and the fourth colored light into a second polarization state in a first sub-frame period, converts the first colored light and the third colored tight into the second polarization state and converts the second colored light and fourth colored light into the first polarization state in a second sub-frame period temporally adjacent to the first sub-frame period, and selectively transmits the colored light in one of the first polarization state and the second polarization state, generates the first colored light and the third colored light in the first sub-frame period, and generates second colored light and the fourth colored light in the second sub-frame period; and a spatial light modulation element provided with a plurality of sub-pixels, capable of independently modulating every sub-frame period one of a set of the first colored light and the third colored light and a set of the second colored light and the fourth colored light respectively entering two of the sub-pixels disposed adjacent to each other.

3. The display device according to claim 1, wherein the four kinds of colored light include blue light, first green light, second green light, and red light, and the first green light and the second green light respectively enter the two sub-pixels of the spatial light modulation element disposed adjacent to each other.

4. The display device according to claim 3, wherein the first green light and the second green light are respectively generated in the two sub-frame periods temporally adjacent to each other.

5. A display device for modulating irradiation light with a spatial light modulation element to form an optical image, and displaying the optical image, comprising:

a light source section including a plurality of light sources capable of respectively emitting four kinds of colored light having wavelength ranges within a visible range and different from each other, making a first light source and a second light source, which are capable of respectively emitting two kinds of colored light out of the four kinds of colored light, and a third light source and a fourth light source, which are capable of respectively emitting two kinds of colored light different from the two kinds of colored light, emit light alternatively, thereby generating first irradiation light including the first colored light and the second colored light and second irradiation light including the third colored light and the fourth colored light alternatively every sub-frame period;

a spatial colored light separating section that spatially separates the two kinds of colored light included in each of the first irradiation light and the second irradiation light to generate the first colored light and the second colored light in a first sub-frame period and to generate the third colored light and the fourth colored light in a second sub-frame period temporally adjacent to the first sub-frame period; and a spatial light modulation element provided with a plurality of sub-pixels, capable of independently modulating every sub-frame period one of a set of the first colored light and the second colored light and a set of the third colored light and the fourth colored light respectively entering two of the sub-pixels disposed adjacent to each other.

6. The display device according to claim 1, wherein the spatial colored light separating section includes a reflecting element having two reflecting surfaces at least one of which is a wavelength selective reflecting surface disposed to have different incident angles with respect to the incident light.

7. The display device according to claim 6, wherein the colored light reflected by the wavelength selective reflecting surface of the reflecting element is the colored light with the weakest light intensity of the colored light emitted from the light sources.

8. The display device according to claim 6, further comprising
a polarization conversion element disposed between the light source and the spatial colored light separating section, and converting unpolarized light emitted from the light source into S-polarized light.

9. A display device for modulating irradiation light with a spatial light modulation element to form an optical image, and displaying the optical image, comprising:

a light source section including a plurality of light sources capable of respectively emitting four kinds of colored light having wavelength ranges within a visible range and different from each other, making a first light source and a second light source, which are capable of respectively emitting two kinds of colored light out of the four kinds of colored light, and a third light source and a fourth light source, which are capable of respectively emitting two kinds of colored light different from the two kinds of colored light, emit light alternatively, thereby generating first irradiation light including the first colored light and the second colored light and second irradiation light including the third colored light and the fourth colored light alternatively every sub-frame period, and also capable of emitting the first colored light and the second colored light to a spatially distant position, and of emitting the third colored light and the fourth colored light to a spatially distant position; and a spatial light modulation element provided with a plurality of sub-pixels, capable of independently modulating every sub-frame period one of a set of the first colored light and the second colored light and a set of the third colored light and the fourth colored light respectively entering two of the sub-pixels disposed adjacent to each other.

10. The display device according to claim 5, wherein the four kinds of colored light include blue light, first green light, second green light, and red light, and the first green light and the second green light respectively enter the two sub-pixels of the spatial light modulation element disposed adjacent to each other.

11. A display device for modulating irradiation light with a spatial light modulation element to form an optical image, and displaying the optical image, comprising:

a light source section for emitting the irradiation light including four kinds of colored light having wavelength ranges within a visible range and different from each other; and a spatial light modulation element provided with a plurality of sub-pixels, and capable of independently modulating first colored light and second colored light respectively enter two of the sub-pixels adjacent to each other in a first sub-frame period, and third colored light and fourth colored light respectively enter the two sub-pixels in a second sub-frame period temporally adjacent to the first sub-frame period.

12. A projector comprising:
the display device according to claim 1; and
a projection section that projects the optical image obtained by the display device.

* * * * *